3,140,953
OLEAGINOUS FOOD PRODUCT
Robert L. Roberts, Orinda, Calif., assignor to General Foods Corporation, White Plains, N.Y., a corporation of Delaware
No Drawing. Filed May 22, 1961, Ser. No. 111,494
8 Claims. (Cl. 99—128)

This invention relates to a dry free-flowing oleaginous foodstuff which is readily reconstitutable to plastic spreadable comestible form.

Heretofore, nut meat butters such as peanut butter and food liquors high in fats and oils such as chocolate liquor, have never been manufactured on a commercial scale in a free-flowing particulate powderous condition.

It is an object of the present invention to provide a free-flowing powderous foodstuff high in fatty and/or oily constituents and which is capable of reconstitution by the housewife or other consumer to a spread.

A more specific object of the present invention is to provide novel food products such as a free-flowing peanut butter or chocolate liquor having a high fat or oil content which is physically stabilized in the product and thereby does not undergo undesirable separation of its oily or fatty components, which product may be readily spread on breads and other baked goods after reconstitution with a suitable liquid such as water.

Briefly stated, the present invention comprises the incorporation in a mass of comminuted food solids high in oil or fat of a specific celluose derivative hereafter generally referred to as alpha cellulose for the purpose of absorbing the free oleaginous phase in the foodstuff. The invention is founded upon the discovery that the alpha cellulose advantageously absorbs a substantial quantity of the free fatty components capable of separation from food solids during or after their comminution. The alpha cellulose may be incorporated into the comminuted mass of food solids either during the subdivision thereof or thereafter as may be convenient to effect a uniform distribution and thereby achieve a substantially heterogeneous distribution of the fatty and oil components otherwise likely to separate. The finding of the present invention has particular utility in the art of manufacturing a dry-to-the-touch free-flowing peanut butter or chocolate liquor although a wide variety of applications is foreseen, ranging from other nut meats high in oil content, such as coconut, to fatty spreads, such as butter and margarine or other fatty emulsions likely to undergo phase separation.

The term alpha cellulose as it is to be understood in the present context applies to a form of cellulosic material polymerized from an anhydro glucose monomer having typically beta-1,4-glucosidic linear linkage and an average molecular weight in the neighborhood of 40,000. The alpha cellulose may be employed as a dried powder or as a liquid colloid suspension. In a dried powder form the alpha cellulose is crystalline, white and free-flowing and can be produced in a range of particle sizes; it is capable of forming a colloidal gel and absorbing fats and oils. It is this latter property which has been found to render alpha celluloses unique in their application to binding the free oily or fatty phase associated with other food solids, thereby offering convenience in the handling of such food solids in a comminuted form. The theory behind this suitability for such food applications is difficult to explain and forms no part of the present invention but is presented here for the sake of better understanding of the mechanism. It is believed that the monomers which make up the alpha cellulose polymer overlay one another in a random fashion such as creates a network of interstices within which discrete particles of free oils and fatty materials become stationed thereby producing a composition quite kindred to the texture of similar food solids from which the fat content has been either completely removed or substantially reduced, the degree of such texture conversion depending upon the level of alpha cellulose employed which level in turn is dependent upon the fat content of comminuted food solids; it is also believed that upon reconstitution of the textured-modified food solids this random arrangement of monomers is altered to the extent that they may be visualized as oriented to an extent permitting release of the oleaginous phase absorbed therein, whereby the oil or fat can be restored to a condition closely approximating the texture contribution it makes in the comminuted food solid free of such an additive. Of course, to achieve this texture reconversion sufficient moisture must be added to the cellulosic material to permit it to unlock the oily phase therewithin.

In practice a variety of applications will occur to the man skilled in the art and the following specific example is provided herein as simply illustrative of the invention.

*Example*

A nut butter, i.e., peanut butter is prepared by the conventional procedure of shelling the peanut after roasting, grinding and homogenizing to produce a uniformly plastic mass of thick spreadable consistency. For each two parts of this mass approximately one part by weight of alpha cellulose is added to the powder form and the mass is then subjected to mixing in a Hobart mixer with a planetary rotary motion for a period of time (usually in the neighborhood of 10 minutes) to heterogeneously distribute the alpha cellulose powder throughout so as to render it relatively indistinguishable appearance-wise in the mixture. As mixing continues the plastic mass gradually assumes a powdery form and in this process therefore undergoes a process of "balling," which balls are subdivided into progressively smaller balls until the desired powderous free-flowing material is achieved. In accomplishing this result the average size of the alpha cellulose has been found to be important and for most applications the alpha cellulose should have an average particle size in the neighborhood of about 300 A. It has been found that with a higher size at 700 A. the material has a coarse, cottony texture upon reconstitution and so for most applications it is preferred to use an average particle size below 500 A. and preferably about 300 A.

The free-flowing powder thus produced could be rubbed in the hand and will not ball-up or return to its original plastic character except on the addition of water, milk and the like. Under normal pressure in the hand of the user the powder can be compacted without substantial release of oil.

Upon storage the powderous mix does not revert to its original plastic state or permit separation of the oil under high storage temperatures and relative humidities.

A most acceptable peanut butter-type spread is obtained from the foregoing mix simply by adding a portion of water to an equal portion by weight of the free-flowing "fixed" peanut butter powder. The spread had a uniform constituency resembling conventional peanut butter spreads. Advantageously and uniquely the peanut butter spread does not cling to the roof of the mouth yet retains all the desirable flavor and texture of a conventional nut butter. By virtue of the nonassimilable character of the alpha cellulose a lower calorie spread is obtainable without loss of the desirable gustatory satisfaction.

In many applications a cottony mouth feel stemming from the presence of the alpha cellulose can be minimized by eployment of a hydrophilic colloid such as sodium carboxymethyl cellulose, hydroxyethyl cellulose and similar anionic celulosic derivatives, since such a colloid will provide a moist, hydrating affect on the mouth thereby minimizing the cottony, drying effect of the alpha cellulose.

Dry free-flowing spread powders can also be produced following essentially the foregoing procedure using such food solids containing oleaginous phases as, chocolate liquor, plasticized coconut meat, creamery butter, shortening, cheese, phosphatides like soy lecithin and meat extracts like beef extract.

While the present invention has been described with particular reference to a specific example, it is not to be limited thereby, but reference is to be had to the appended claims for a definition of its scope.

What is claimed is:

1. A dry-to-the-touch free-flowing powderous foodstuff derived from a finely comminuted comestible high in oleaginous matter and capable of reconstitution with moisture to a spreadable plastic consistency, said foodstuff having microcrystalline alpha cellulose employed therein to absorb its oleaginous matter, said alpha cellulose having an average particle size of 300 A. to 500 A.

2. A product according to claim 1 wherein said comminuted comestible is peanut butter.

3. A product according to claim 1 wherein the foodstuff includes a hydrophilic cellulose derivative.

4. A product according to claim 2 wherein the foodstuff includes a hydrophilic cellulose derivative.

5. A product according to claim 1 wherein the foodstuff contains sodium carboxymethyl cellulose.

6. A product according to claim 1 wherein the foodstuff contains hydroxyethyl cellulose.

7. A product according to claim 2 wherein the foodstuff contains sodium carboxymethyl cellulose.

8. A product according to claim 2 wherein the foodstuff contains hydroxyethyl cellulose.

References Cited in the file of this patent

UNITED STATES PATENTS

| | | |
|---|---|---|
| 2,217,701 | Musher | Oct. 15, 1940 |
| 2,555,467 | Bogin et al. | June 5, 1951 |
| 2,827,452 | Schlenk et al. | Mar. 18, 1958 |
| 2,876,160 | Schoch et al. | Mar. 3, 1959 |
| 3,023,104 | Battista | Feb. 27, 1962 |

OTHER REFERENCES

"Polysaccharide Chemistry," by Whistler et al., 1953, Academic Press, Inc., Publishers, New York, pages 74, 89, 92 and 93.